US011740855B2

(12) United States Patent
Kumar et al.

(10) Patent No.: US 11,740,855 B2
(45) Date of Patent: *Aug. 29, 2023

(54) ACCOUNT AWARE MEDIA PREFERENCES

(71) Applicant: Sonos, Inc., Santa Barbara, CA (US)

(72) Inventors: Abhishek Kumar, Santa Barbara, CA (US); Ron Kuper, Arlington, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/773,947

(22) Filed: Jan. 27, 2020

(65) Prior Publication Data
US 2020/0183643 A1   Jun. 11, 2020

Related U.S. Application Data

(63) Continuation of application No. 16/011,080, filed on Jun. 18, 2018, now Pat. No. 10,545,721, which is a (Continued)

(51) Int. Cl.
*G06F 17/00* (2019.01)
*G06F 3/16* (2006.01)
(Continued)

(52) U.S. Cl.
CPC ............ *G06F 3/165* (2013.01); *G06F 16/637* (2019.01); *H04L 67/306* (2013.01);
(Continued)

(58) Field of Classification Search
CPC . G06F 3/16; G06F 3/162; G06F 3/165; G06F 3/167; G06F 16/40; G06F 16/43;
(Continued)

(56) References Cited

U.S. PATENT DOCUMENTS 5,440,644 A    8/1995  Farinelli et al.
5,761,320 A    6/1998  Farinelli et al.
(Continued)

FOREIGN PATENT DOCUMENTS

CN    101495994 A    7/2009
CN    103369407 A    10/2013
(Continued)

OTHER PUBLICATIONS

AudioTron Quick Start Guide, Version 1.0, Mar. 2001, 24 pages.
(Continued)

*Primary Examiner* — Paul C McCord
(74) *Attorney, Agent, or Firm* — Akerman LLP

(57) ABSTRACT

Embodiments described herein involve providing media item preferences according to a user account of a user providing the preference, rather than a user account providing the media item. When a user indicates a preference for a media item, the preference are associated with that particular user, rather than with another user whose account the media item may have been accessed and played through when the particular user indicated the preference. As a result, a media preference history associated with the account providing the media item will not be disrupted by other users indicating preferences for the media item. Further, users may build on their respective media preference histories even when listening to music provided by someone else.

20 Claims, 5 Drawing Sheets

Related U.S. Application Data continuation of application No. 15/081,922, filed on Mar. 27, 2016, now Pat. No. 10,001,967, which is a continuation of application No. 14/229,333, filed on Mar. 28, 2014, now Pat. No. 9,338,514.

(51) Int. Cl.

| | | |
|---|---|---|
| *H04L 67/306* | (2022.01) | |
| *H04N 21/475* | (2011.01) | |
| *G06F 16/635* | (2019.01) | |
| *H04N 21/258* | (2011.01) | |
| *H04N 21/432* | (2011.01) | |
| *H04N 21/436* | (2011.01) | |
| *H04N 21/658* | (2011.01) | |
| *H04N 21/81* | (2011.01) | |
| *H04R 27/00* | (2006.01) | |

(52) U.S. Cl.
CPC ... *H04N 21/25891* (2013.01); *H04N 21/4325* (2013.01); *H04N 21/43615* (2013.01); *H04N 21/4755* (2013.01); *H04N 21/4756* (2013.01); *H04N 21/6582* (2013.01); *H04N 21/8113* (2013.01); *H04R 27/00* (2013.01); *H04R 2227/003* (2013.01); *H04R 2227/005* (2013.01)

(58) Field of Classification Search
CPC .... G06F 16/432; G06F 16/433; G06F 16/435; G06F 16/437; G06F 16/438; G06F 16/4387; G06F 16/48; G06F 16/483; G06F 16/489; G06F 16/60; G06F 16/63; G06F 16/632; G06F 16/634; G06F 16/635; G06F 16/637; G06F 16/638; G06F 16/639; G06F 16/68; G06F 16/683; G06F 16/685; G06F 16/686; H04L 65/604; H04L 67/306; H04N 21/306; H04N 21/4825; H04N 21/4126; H04N 21/4307; H04N 21/4755; H04N 21/4788; H04N 21/8113; H04N 21/6582; H04N 21/4756; H04N 21/25891; H04N 21/4325; H04N 21/43615; H04N 21/43612; G06Q 10/101; H04R 27/00; H04R 2227/003; H04R 2227/005
USPC .......................................................... 700/94
See application file for complete search history.

(56) References Cited

U.S. PATENT DOCUMENTS

| | | | |
|---|---|---|---|
| 5,923,902 A | 7/1999 | Inagaki | |
| 6,032,202 A | 2/2000 | Lea et al. | |
| 6,256,554 B1 | 7/2001 | Dilorenzo | |
| 6,404,811 B1 | 6/2002 | Cvetko et al. | |
| 6,469,633 B1 | 10/2002 | Wachter et al. | |
| 6,522,886 B1 | 2/2003 | Youngs et al. | |
| 6,611,537 B1 | 8/2003 | Edens et al. | |
| 6,631,410 B1 | 10/2003 | Kowalski et al. | |
| 6,757,517 B2 | 6/2004 | Chang et al. | |
| 6,763,040 B1 | 7/2004 | Hite et al. | |
| 6,778,869 B2 | 8/2004 | Champion | |
| 6,915,176 B2 | 7/2005 | Novelli et al. | |
| 7,130,616 B2 | 10/2006 | Janik | |
| 7,143,939 B2 | 12/2006 | Henzerling | |
| 7,236,773 B2 | 6/2007 | Thomas | |
| 7,295,548 B2 | 11/2007 | Blank et al. | |
| 7,483,538 B2 | 1/2009 | McCarty et al. | |
| 7,571,014 B1 | 8/2009 | Lambourne et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,797,471 B2 | 9/2010 | Laefer et al. | |
| 7,853,341 B2 | 12/2010 | McCarty et al. | |
| 7,917,853 B2 | 3/2011 | Trauth | |
| 7,987,294 B2 | 7/2011 | Bryce et al. | |
| 7,995,899 B2 | 8/2011 | Heredia et al. | |
| 8,014,423 B2 | 9/2011 | Thaler et al. | |
| 8,045,952 B2 | 10/2011 | Qureshey et al. | |
| 8,099,334 B1* | 1/2012 | Stockwell .......... G06Q 30/0601 705/26.1 | |
| 8,103,009 B2 | 1/2012 | McCarty et al. | |
| 8,200,602 B2 | 6/2012 | Farrelly | |
| 8,234,395 B2 | 7/2012 | Millington | |
| 8,271,114 B2 | 9/2012 | Lydon et al. | |
| 8,483,853 B1 | 7/2013 | Lambourne | |
| 8,595,793 B2 | 11/2013 | Kashyap et al. | |
| 8,700,714 B1* | 4/2014 | Pan .................... H04N 21/4751 709/206 | |
| 8,910,265 B2 | 12/2014 | Lang et al. | |
| 9,021,370 B1* | 4/2015 | Carlson .............. G06Q 30/0607 715/753 | |
| 9,338,514 B2 | 5/2016 | Kumar et al. | |
| 9,374,607 B2 | 6/2016 | Bates et al. | |
| 9,497,500 B1* | 11/2016 | Robinson ......... H04N 21/43615 | |
| 10,001,967 B2 | 6/2018 | Kumar et al. | |
| 10,296,884 B2 | 5/2019 | Lang et al. | |
| 10,545,721 B2* | 1/2020 | Kumar .............. H04N 21/4755 | |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0124097 A1 | 9/2002 | Isely et al. | |
| 2003/0135513 A1 | 7/2003 | Quinn et al. | |
| 2003/0157951 A1 | 8/2003 | Hasty | |
| 2004/0024478 A1 | 2/2004 | Hans et al. | |
| 2005/0021470 A1 | 1/2005 | Martin et al. | |
| 2006/0195512 A1 | 8/2006 | Rogers et al. | |
| 2007/0038999 A1 | 2/2007 | Millington | |
| 2007/0142944 A1 | 6/2007 | Goldberg et al. | |
| 2007/0265979 A1 | 11/2007 | Hangartner | |
| 2008/0052371 A1 | 2/2008 | Partovi et al. | |
| 2008/0189272 A1 | 8/2008 | Powers et al. | |
| 2008/0222295 A1* | 9/2008 | Robinson ............... G06Q 10/10 709/227 | |
| 2008/0229215 A1 | 9/2008 | Baron et al. | |
| 2008/0235592 A1 | 9/2008 | Trauth | |
| 2009/0222392 A1 | 9/2009 | Martin et al. | |
| 2009/0249222 A1* | 10/2009 | Schmidt .................. H04L 51/32 715/751 | |
| 2009/0249244 A1* | 10/2009 | Robinson ............. G06F 3/04842 715/781 | |
| 2009/0254548 A1 | 10/2009 | Nagano et al. | |
| 2010/0180010 A1 | 7/2010 | Prestenback et al. | |
| 2010/0228740 A1 | 9/2010 | Cannistraro et al. | |
| 2011/0265003 A1 | 10/2011 | Schubert et al. | |
| 2011/0314388 A1 | 12/2011 | Wheatley | |
| 2012/0070017 A1 | 3/2012 | Dorogusker et al. | |
| 2013/0046755 A1 | 2/2013 | Svendsen et al. | |
| 2013/0073584 A1* | 3/2013 | Kuper .................... G06F 16/48 707/769 | |
| 2013/0191399 A1 | 7/2013 | Tocaben et al. | |
| 2013/0254663 A1 | 9/2013 | Bates et al. | |
| 2013/0263169 A1 | 10/2013 | Pedlow et al. | |
| 2013/0279878 A1 | 10/2013 | Haverkamp | |
| 2013/0339859 A1* | 12/2013 | Hardi ...................... H04W 4/80 715/728 | |
| 2013/0347117 A1 | 12/2013 | Parks et al. | |
| 2014/0013342 A1 | 1/2014 | Swan et al. | |
| 2014/0018153 A1* | 1/2014 | Nelson ................ G07F 17/3227 463/25 | |
| 2014/0123006 A1 | 5/2014 | Chen et al. | |
| 2014/0250208 A1 | 9/2014 | Billmaier et al. | |
| 2014/0331332 A1 | 11/2014 | Arrelid et al. | |
| 2015/0066494 A1 | 3/2015 | Salvador et al. | |
| 2015/0100623 A1* | 4/2015 | Gudell .................... H04L 67/42 709/203 | |
| 2017/0177585 A1 | 6/2017 | Rodger et al. | |

(56) References Cited

U.S. PATENT DOCUMENTS

FOREIGN PATENT DOCUMENTS

| EP | 1389853 A1 | 2/2004 |
|---|---|---|
| JP | 2001036832 A | 2/2001 |
| JP | 2008176126 A | 7/2008 |
| JP | 2009252010 A | 10/2009 |
| JP | 2012222569 A | 11/2012 |
| JP | 2013131165 A | 7/2013 |
| JP | 2013210687 A | 10/2013 |
| WO | 2003093950 A2 | 11/2003 |
| WO | 2006107776 A2 | 10/2006 |
| WO | 2011102508 A1 | 8/2011 |

OTHER PUBLICATIONS

AudioTron Reference Manual, Version 3.0, May 2002, 70 pages.
AudioTron Setup Guide, Version 3.0, May 2002, 38 pages.
Bluetooth "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Chinese Patent Office, First Office Action dated Oct. 30, 2017, issued in connection with Chinese Patent Application No. 201580016924.3, 3 pages.
Chinese Patent Office, Office Action dated May 4, 2017, issued in connection with Chinese Application No. 201580016924.3, 13 pages.
Chinese Patent Office, Third Office Action dated Dec. 29, 2017, issued in connection with Chinese Patent Application No. 201580016924.3, 7 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Office Action dated Feb. 26, 2019, issued in connection with European Application No. 15767945.7, 3 pages.
European Patent Office, Extended European Search Report dated Dec. 13, 2016, issued in connection with European Application No. 15767945.7-1908, 7 pages.
Final Office Action dated Oct. 1, 2018, issued in connection with U.S. Appl. No. 16/011,080, filed Jun. 18, 2018, 19 pages.
International Bureau,International Preliminary Report on Patentability dated Oct. 13, 2016, issued in connection with International Application No. PCT/US2015/022940, filed on Mar. 27, 2015, 9 pages.
International Searching Authority, International Search Report and Written Opinion dated Jun. 11, 2015, issued in connection with International Application No. PCT/US2015/022940, filed on Mar. 27, 2015, 12 pages.

Japanese Patent Office, Office Action dated Sep. 11, 2018, issued in connection with Japanese Application No. 2017-180908, 4 pages.
Japanese Patent Office, Office Action dated Feb. 28, 2017, issued in connection with Japanese Patent Application No. 2016-569959, 9 pages.
Japanese Patent Office, Office Action dated Jan. 28, 2020, issued in connection with Japanese Patent Application No. 2019-051007, 6 pages.
Japanese Patent Office, Translation of Office Action dated Sep. 11, 2018, issued in connection with Japanese Application No. 2017-180908, 1 page.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Jun. 6, 2017, issued in connection with U.S. Appl. No. 15/081,922, filed Mar. 27, 2016, 23 pages.
Non-Final Office Action dated Feb. 12, 2019, issued in connection with U.S. Appl. No. 16/011,080, filed Jun. 18, 2018, 17 pages.
Notice of Allowance dated Feb. 3, 2016, issued in connection with U.S. Appl. No. 14/229,333, filed Mar. 28, 2014, 5 pages.
Notice of Allowance dated Sep. 18, 2019, issued in connection with U.S. Appl. No. 16/011,080, filed Jun. 18, 2018, 8 pages.
Notice of Allowance dated Feb. 5, 2018, issued in connection with U.S. Appl. No. 15/081,922, filed Mar. 27, 2016, 5 pages.
Palm, Inc., "Handbook for the Palm VII Handheld," May 2000, 311 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Chinese Patent Office, First Office Action and Translation dated Feb. 23, 2021, issued in connection with Chinese Application No. 201810456929.3, 14 pages.
European Patent Office, Summons to Attend Oral Proceedings mailed on Jun. 21, 2021, issued in connection with European Application No. 15767945.7, 7 pages.

\* cited by examiner

ACCOUNT AWARE MEDIA PREFERENCES

CROSS-REFERENCE TO RELATED APPLICATIONS

The present application is a continuation of U.S. application Ser. No. 16/011,080, titled "Account Aware Media Preferences," filed Jun. 18, 2018, and currently pending; U.S. application Ser. No. 16/011,080 is a continuation of U.S. application Ser. No. 15/081,922, titled "Account Aware Media Preferences," filed Mar. 27, 2016, and issued on Jun. 19, 2018, as U.S. Pat. No. 10,001,967; U.S. application Ser. No. 15/081,922 is a continuation of U.S. application Ser. No. 14/229,333, titled "Account Aware Media Preferences," filed Mar. 28, 2014, and issued on May 10, 2016, as U.S. Pat. No. 9,338,514. The entire contents of the Ser. No. 16/011,080; Ser. No. 15/081,922; and Ser. No. 14/229,333 applications are incorporated herein by reference.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were severely limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from virtually unlimited sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
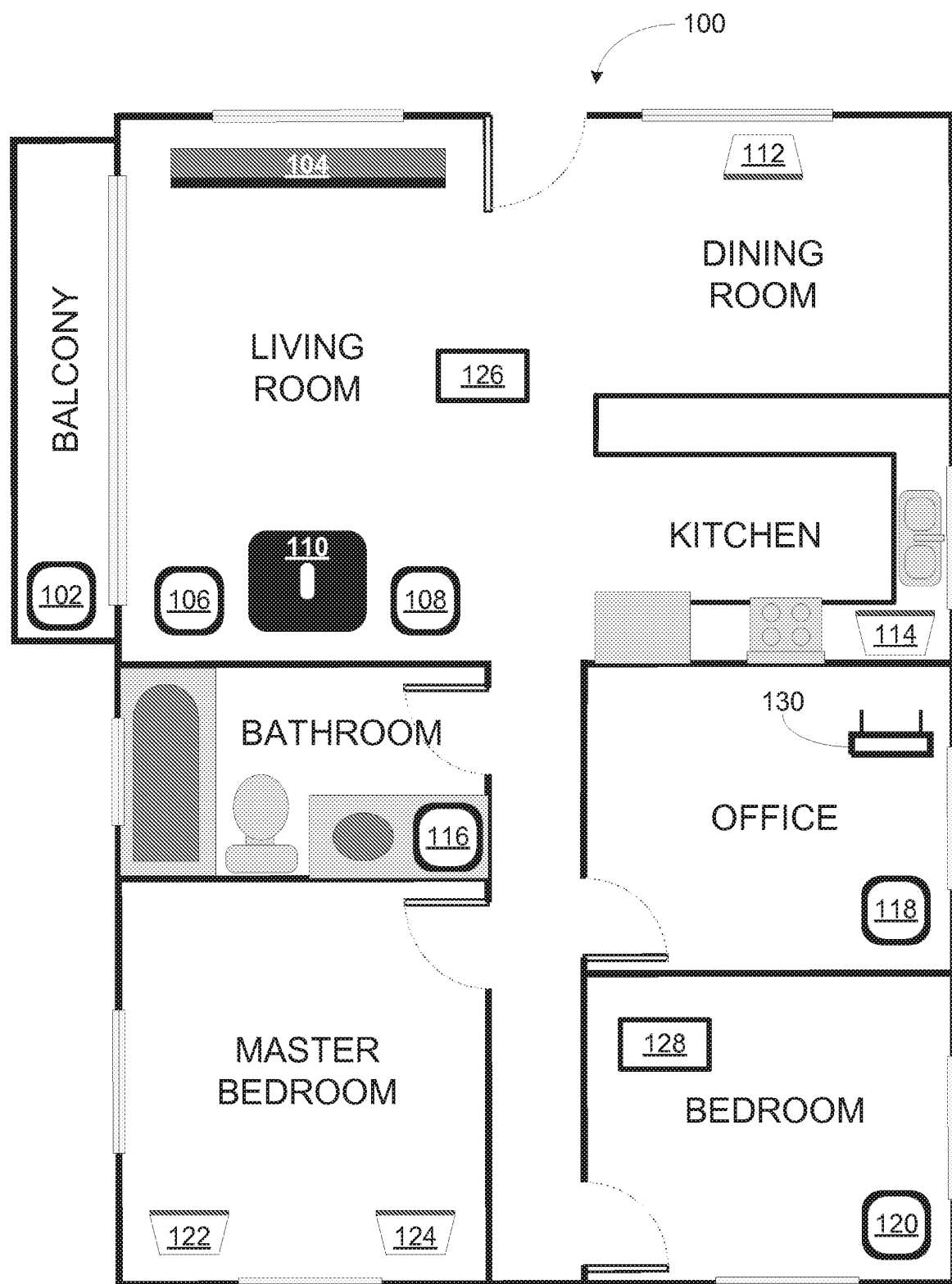
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Embodiments described herein involve providing media item preferences according to a user account associated with a user providing the preference, rather than a user account that was used to access and play the media item. In other words, when a user indicates a preference for a media item, the preference may be associated with that particular user, rather than with a different user whose account was used to access the media item being played. As a result, media preference settings associated with the account used to access the media item will not be disrupted by other users indicating preferences for the media item. Further, users may build on their respective media preference settings even when listening to music provided by someone using a different account.

In one embodiment, a controller device associated with a media playback system may display information for a music track that is being played by the media playback system. The media playback system may have accessed the music track from a service provider using a first user account. When a user uses the controller device to indicate a preference for the music track being played (e.g. thumb up, thumb down, skip forward, mark as favorite, etc.), the preference may be associated with a user account other than the first user account. In other words, the preference can be associated with a second user account instead of the first account used to access and play the media item.

In one example, the music track may be skipped in response to the preference indication, but the preference itself is not recorded or provided to the service provider in association with the first user account used to access and play the media item. In another example, both the preference and information identifying the second user account may be provided to the service provider and/or the media playback system. In one case, the preference may then be recorded by the service provider in association with the second user account.

In one example, the preference may be associated with the second account because the controller device is associated with the second user account. For instance, the controller device may be a personal device of a user associated with the second account. Accordingly, preferences indicated via the controller device are associated with the second user account. In another example, the controller device may have multiple user accounts, and the preference may be associated with the second user account because the second user account was active when the preference is provided. In yet another example, the controller device may prompt the user to enter, or select an account to associate the preference with, upon receiving the indication of the preference.

As indicated above, examples provided herein relate to providing media item preferences according to a user account of a user providing the preference. In one embodiment, a method is provided. The method involves receiving, by a computing device, information identifying media content. The media content is associated with a first user account and a first service provider. The method also involves receiving, by the computing device, an input indicating a preference associated with the media content. The method further involves responsive to the input, sending, by the computing device, a transmission comprising (i) the preference associated with the media content, and (ii) information associated with a second user account.

In another embodiment, a device is provided. The device includes a processor and memory having stored thereon instructions executable by the processor to cause the device to perform functions. The functions include receiving information identifying media content. The media content is associated with a first user account and a first service provider. The functions also include receiving an input indicating a preference associated with the media content. The functions further include, responsive to the input, sending, by the computing device, a transmission comprising (i) the preference associated with the media content, and (ii) information associated with a second user account.

In another embodiment, a non-transitory computer readable memory is provided. The non-transitory computer readable memory has stored thereon instructions executable by a computing device to cause the computing device to perform functions. The functions include receiving information identifying media content. The media content is associated with a first user account and a first service provider. The functions also include receiving an input indicating a preference associated with the media content. The functions further include, responsive to the input, sending, by the computing device, a transmission comprising (i) the preference associated with the media content, and (ii) information associated with a second user account.

In another embodiment, a method is provided. The method involves receiving, by a computing device, a request for content. The request is associated with a first user account. The method also involves, responsive to the request, transmitting media content to a media playback system. The media content is determined based on the request. The method further involves receiving a transmission identifying (i) preference data associated with the transmitted media content, and (ii) a second user account, and responsive to the transmission, associating the preference data with the second user account.

In another aspect, a device is provided. The device includes a processor and memory having stored thereon instructions executable by the processor to cause the device to perform functions. The functions include receiving, by a computing device, a request for content. The request is associated with a first user account. The functions also include, responsive to the request, transmitting media content to a media playback system. The media content is determined based on the request. The functions further include receiving a transmission identifying (i) preference data associated with the transmitted media content, and (ii) a second user account, and responsive to the transmission, associating the preference data with the second user account.

In yet another aspect, a non-transitory computer readable memory is provided. The non-transitory computer readable memory has stored thereon instructions executable by a computing device to cause the computing device to perform functions. The functions include receiving, by a computing device, a request for content. The request is associated with a first user account. The functions also include, responsive to the request, transmitting media content to a media playback system. The media content is determined based on the request. The functions further include receiving a transmission identifying (i) preference data associated with the transmitted media content, and (ii) a second user account, and responsive to the transmission, associating the preference data with the second user account.

It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
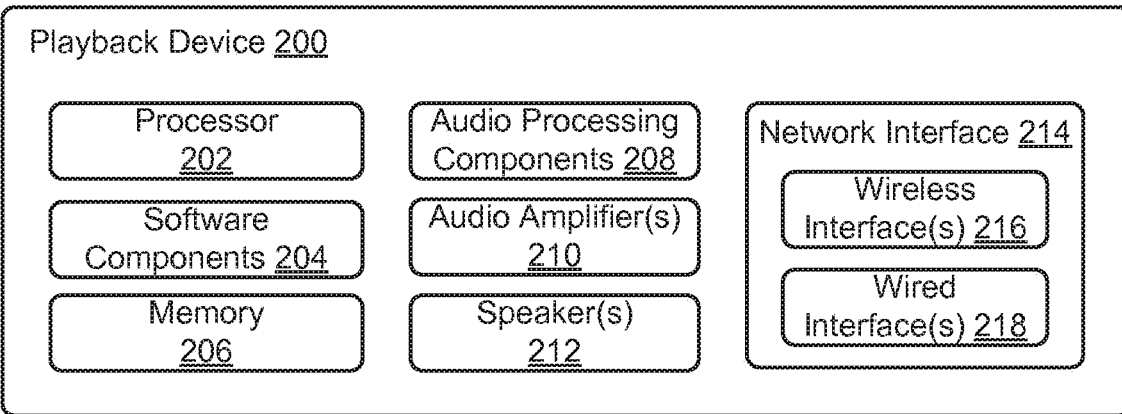
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
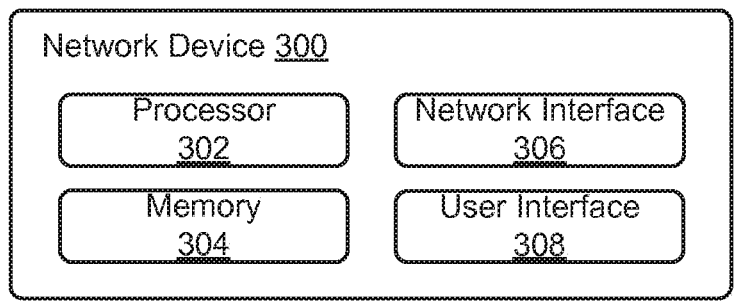
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™ iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
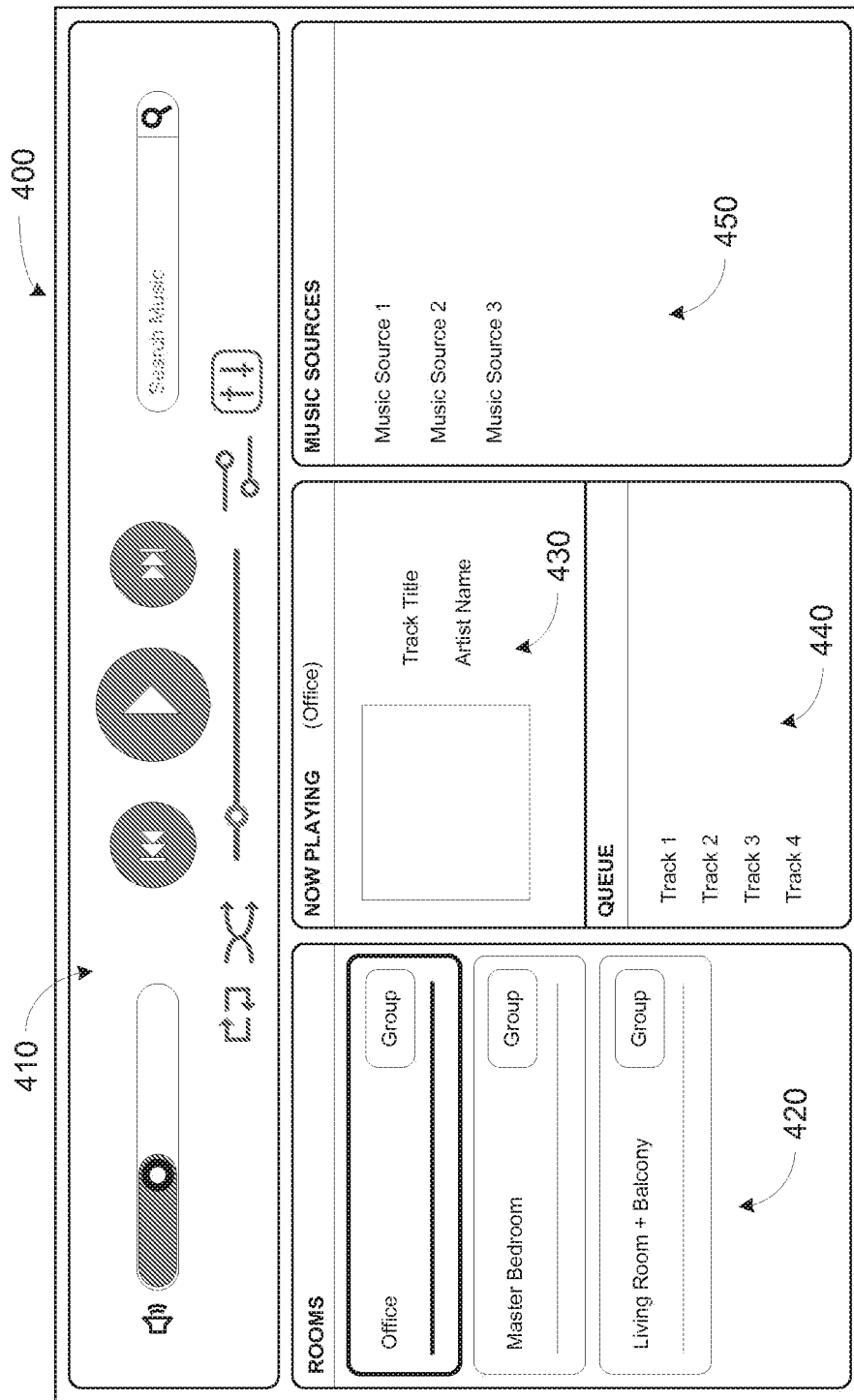
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Methods for Providing Media Item Preferences

Figure 5:
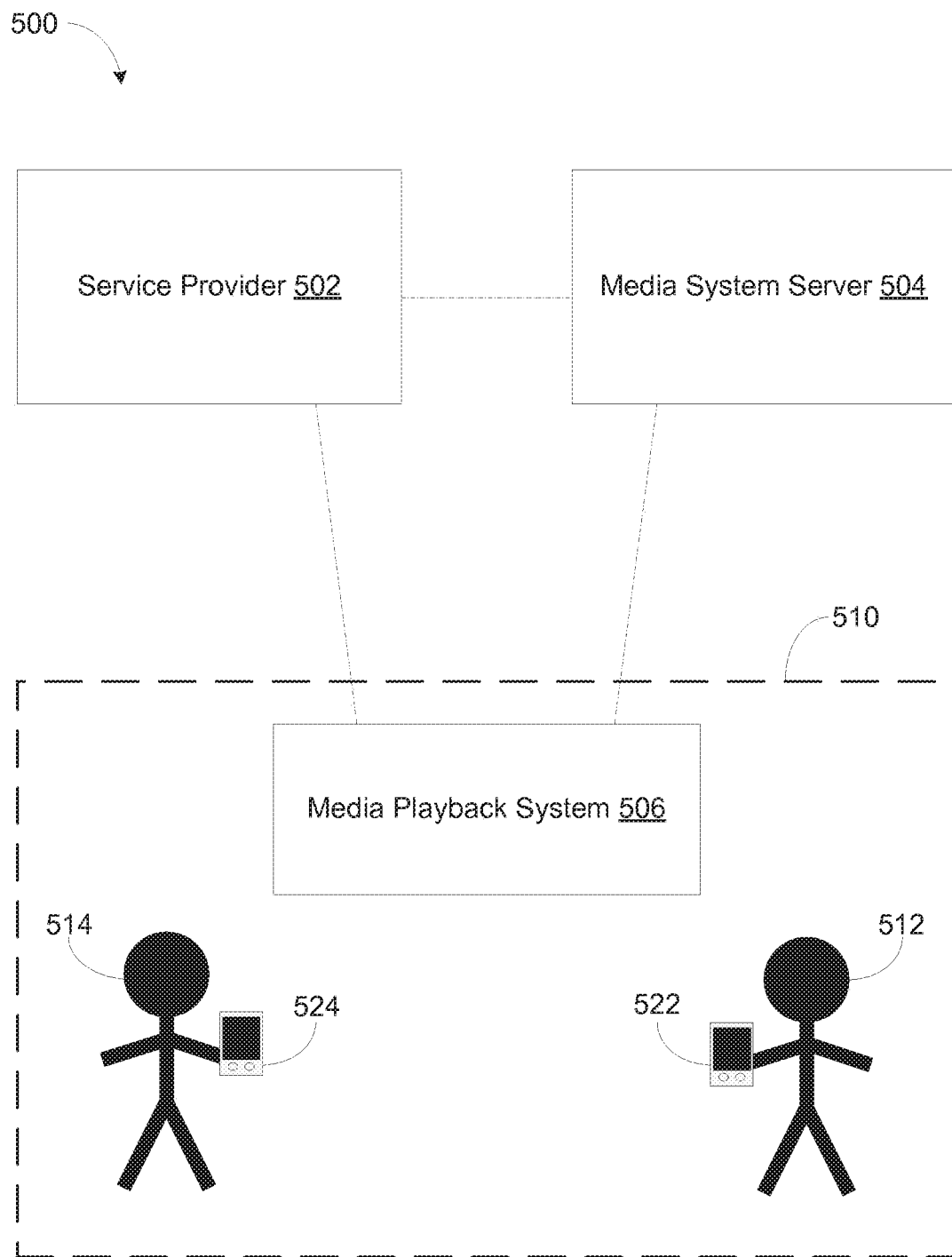
FIG. 5 shows an example media playback system environment.

As discussed above, embodiments described herein may involve providing media item preferences according to a user account of a user providing the preference, rather than a user different account that was used to access and play the media item. To help illustrate the embodiments, FIG. 5 shows an example media playback system environment 500 within which the embodiments may be implemented and/or applied. As shown, the media playback system environment includes a service provider 502, a media system server 504, a media playback system 506, and a playback environment 510. The playback environment 510 further includes users 512 and 514 accessing controllers 522 and 524, respectively. The controllers 522 and 524 may both be configured to access, control, and/or manage the media playback system. The controllers 522 and 524 may be devices similar to the control device 300 discussed above in connection to section II.c. and FIG. 3. Each of the service provider 502, media system server 504, media playback system, controller 522, and controller 524 may communicate with each other either directly, or indirectly via another device, over a local area network (LAN), wide area network (WAN) or some combination thereof.

The service provider 502 may be a media streaming service that provides media content to the media playback system 506 for playback. The service provider may generate, for example, catered playlists or "radio channels", and/or recommend artists, tracks, or playlists based on media preferences associated with a user account. The media preferences may be a part of a user account setting associated with the service provider 502, and may have been compiled based on implicit and/or explicit preferences for media items over time. Additionally, or alternatively, the service provider may provide access to various media items for users to choose from.

The media system server 504 may store information, such as playback device information, playback zone information, and/or service provider association information, among other information for media playback systems including the media playback system 506. The media playback system 506 may be a playback system such as that described above in connection to FIG. 1, and may include one or more playback devices configured to play media content in synchrony within one or more playback zones. The playback environment 510 may represent a household of multiple playback zones or a single playback zone or zone group within the household.

In one example, user 512 may use the controller 522 to access the service provider 502 to play music in the environment 510. In one case, the user 512 may access the service provider 502 using a first user account to browse through content available from the service provider 502 and choose media content to be played. In one example, the first user account may be personal user account that the user 512 uses to access the service provider 502. If the first user account is associated with previously indicated preferences for media content available from the service provider 502, the service provider 502 may provide or recommend music to the first user account based on those preferences. Alternatively, the user 512 may simply use the first user account to browse media items available from the service provider 502. When the user 512 uses the controller 522 to select media content to be played by the media playback system 506, the controller 522 may send a request for media content to the service provider 502, and the service provider 502 may responsively provide media content based on the request. The media playback system 506 may then play the provided media content.

In one embodiment, the user 514 may access the media playback system 506 using the controller 524 to view, control, and/or manage the media playback system 506. As such, the user 514 may view content from the service provider 502 that is associated with the first user account. For instance, if the user 512 used the first user account to play music from the service provider 502 on the media playback system 506 as described above, the user 514 may view via the controller 524, information for the music being played.

In one example, the user 514 may indicate a preference for the media content being accessed and played using the first user account. The preference, however, may be associated with a second user account instead of the first user account. Accordingly, the preference provided by the user 514 will not modify any preference settings associated with the first user account. Further, if the second user account is an account the user 514 uses to access the service provider 502, the preference provided by the user 514 may be associated with the second user account to build on the preference settings of the second user account.

Figure 6:
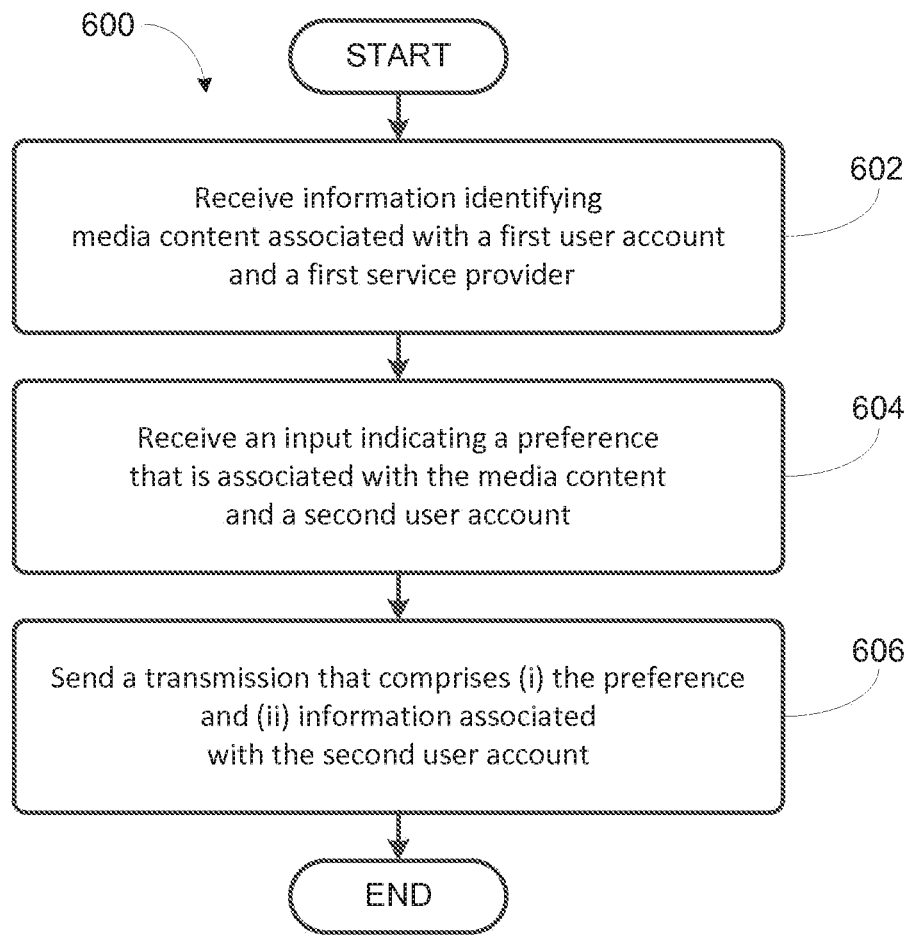
FIG. 6 shows an example flow diagram for providing a media preference associated with a user account.

FIG. 6 shows an example flow diagram 600 for providing a media preference associated with the user 514. Continuing with the example above, the method 600 may be performed by a controller, such as the controller 524 or 522. Method 600 shown in FIG. 6 presents an embodiment of a method that can be implemented within an operating environment involving, for example, the media playback system 100 of FIG. 1, one or more of the playback device 200 of FIG. 2, one or more of the control device 300 of FIG. 3, and the media playback system environment 500 of FIG. 5. Method 600 may include one or more operations, functions, or actions as illustrated by one or more of blocks 602-606. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 600 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 600 and other processes and methods disclosed herein, each block in FIG. 5 may represent circuitry that is wired to perform the specific logical functions in the process.

At block 602, the method 600 involves receiving information identifying media content associated with a first user account and a first service provider. Continuing with the above example, the first service provider may be the service provider 502, and the first user account may be the first user account discussed above. In other words, the media content in this example may be music from the service provider 502 that the user 512 selected to be played by the media playback system 506.

The first user account may be a user account with the service provider 502. In one case, the first user account may be associated with one or more user profiles used to access the media playback system 506 and/or the media system server 504. In other words, the first user account may be used by each of the one or more user profiles to access the service provider 502 the media playback system 506.

In one example, the media content may be associated with the first user account because the first user account was active on a controller, such as the controller 522 when the user 512 selected the media content to be played. In one example, the first user account may be an account for the user 512, and the controller 522 may be a personal device of user 512. As such, any media content played or accessed via the controller 522 may be associated with the first user account. In another example, multiple user accounts may be available on the controller 522. As such, the user 512 may select from a list of available user accounts available on the controller before selecting the media item to be played. In one case, the selection of the user account may be based on a user profile associated with the user account. For instance, the user 512 may use a particular user profile to access the controller 522 and/or the media playback system 506. As such, the first user account may become active whenever the particular user profile is being used or is active. Other examples are also possible. As such, if the user 512 selected the first user account when accessing the controller 522 to play the media item, the media item may be associated with the first user account. Other examples are also possible.

In one example, the identified media content may be media content being played by playback devices in the media playback system 506. In another example, the media content may be any media content available from the service provider 502. The information identifying the media content may be received from the service provider 502 that is providing the media content, a device in the media playback system 506, such as a playback device, and/or the media system server 504. In one case, different portions of the information identifying the media content may be received from different sources.

The received information may be displayed by the controller 524 for the user 514 to view. The display of the received information may be similar to that shown and described above in connection to FIG. 4. As indicated above, upon viewing the information identifying the media content, the user 514 may wish to provide a preference for the media item.

At block 604, the method 600 involves receiving an input indicating a preference associated with the media content. Continuing with the examples above, the input may be provided by the user 514 using the controller 524. The preference may be an explicit preference or an implicit preference. An explicit preference may include "like" "dislike", thumb up, thumb down, or a rating (such as a number of stars, for example) qualifier provided for the media item. An implicit preference may include a selection of the media item, or a skipping or fast forwarding of the media item.

The form in which preference is provided by the user may vary by service provider. For instance, the service provider 502 may use thumb up/down qualifiers and therefore provide the user with options to thumb up or thumb down the media item, while another service provider may use a star rating qualifier and therefore provide the user with options to give the media item a star rating. In some cases, the service provider may use more than one type of preference qualifier. For example, the service provider 502, while using the thumb up/down qualifiers, may also take into account implicit preferences, such as when the user selects or skips the media content. Other examples are also possible.

The input indicating the preference that is associated with the media content may in some cases further indicate a second user account that is associated with the preference. Like the first user account, the second user account may be a service provider user account with the service provider 502, and may be associated with one or more user profiles used to access the media playback system 506 or media system server 504. In one example, the association between the preference and the second user account may be based on the controller from which the preference input is received.

For example, if the controller 524 is associated with the second user account, any input indicating preferences to media content received on the controller 524 may be associated with the second user account. In one example, the controller 524 may be associated with the second user account because the controller 524 is a personal device belonging to the user 514, and the user 514 accesses the service provider 502 using the second user account. In another example, the controller 524 may be associated with the second user account because account information (i.e. access credentials) for the second user account is stored on the controller 524. Other examples are also possible.

In another example, multiple user accounts may be accessed via the same controller, such that the first user account and the second user account are both accessible via the controller 524. For example, the media playback system 506 may be associated with multiple user accounts for the same service, such as service provider 502, and controllers operating the media playback system 506 may select which account the controller should be associated with. Thus, the controllers 522 and 524 may be separate representations of the same controller as they are handed back and forth between the user 512 and the user 514 and different user accounts are selected to manage and control the media playback system 506. As indicated previously in connection to the first user account, each of the user accounts may be associated with one or more user profiles used to access the controller 524 and/or media playback system 506. As such, the different user accounts may be selected based on a user profile that is active and used by either user 512 or 514.

Whichever the case, the user 514 may interact with the controller 522 to cause the second user account to become active, such that any settings, playlists, or preferences etc. associated with the second user account becomes available via the controller 522. Accordingly, any preferences provided via the controller 522 while the second user account is active may be associated with the second user account regardless of whether the media content was played using the first user account on the controller 524, the controller 522, or any other controller. Subsequently, if the first user account becomes active, any preferences provided via the controller 524 may be associated with the first user account. In some instances, one or more user accounts may be active on the controllers 522 and/or 524 at a given time.

In another example when multiple user accounts are accessible via the same controller, the controller may, upon receiving a preference for the media item, prompt the user of the controller to indicate which user account the user wishes to associate the preference with. In some cases, the preference may be applied to more than one user account at a time.

At block 606, the method 600 involves sending a transmission that comprises (i) the preference associated with the media content, and (ii) information associated with the second user account. The transmission may be sent as one or more messages. The transmission may be transmitted in response to receiving the input as discussed above in connection to block 604. Continuing with the examples above, the transmission may be transmitted to the service provider 502 and/or the media system server 504. In one example, the transmission may be transmitted to the service provider 502 via the media system server 504. In some cases, information associated with the media content, such as metadata or a service provider identification of the media content, may also be included in the transmission and transmitted to the service provider 502 and/or the media system server 504.

The service provider 502, the media system server 504, the media playback system 506, and in some cases the controllers 522 and 524 may then perform additional functions according to the transmission. In one example, if the preference indicated a skip forward, a dislike, a thumb down, or any other negative preference for the media content, playback of the media content may be stopped. In one case, the media playback system 506, upon receiving the negative preference for the media content, may stop playback of the media content, and send the service provider 502 a request for different media content. The media playback system may also send the preference to the service provider 502 if the service provider did not already receive the preference.

In another case, playback of the media content may be stopped because the service provider 502, in response to the negative preference received, stops providing the media content and replaces the media content with new media content. The new media content may be identified based on both the original request for media content from the first user account, and the preference from the second user account.

In yet another example, if the second user account is a user account with the service provider 502, the preference may be provided to the service provider 502 along with information identifying the second user account. As such, the service provider 502 may associate the preference with the second user account. The service provider 502 may then use this preference information when providing or recommending media content to the second user account.

In a further example, the second user account may not have access to the service provider 502. For instance, the second user account may be a media playback system user account for accessing the media playback system 506 and does not have access to the service provider 502. In such a case, the preference provided by the second user account in association with the media item accessed and played using the first user account may simply be discarded.

In yet another example, the preference associated with the second user account may be provided to the media system server 504. As suggested above, user accounts for the media playback system 506 may be stored and maintained in the media system server 504. If the second user account is a user account for accessing the media playback system 506, the preference may be provided to the media system server 504, and the preference may be associated with the second user account.

In any of the above cases, the transmission sent to the service provider 502 as discussed in connection to block 606 may further indicate to the service provider 502 that the preference should not be associated with the service provider 502 user account of user 512. In addition, in the case the preference is provided in the form of an action, such as a skip or fast forward, the action of skipping or fast forwarding the track may still be performed whether or not the preference associated with user 514 is discarded, or associated with another user account. Other examples are also possible.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated above, examples provided herein relate to providing media item preferences according to a user account of a user providing the preference. In one embodiment, a method is provided. The method involves receiving, by a computing device, information identifying media content. The media content is associated with a first user account and a first service provider. The method also involves receiving, by the computing device, an input indicating a preference associated with the media content. The method further involves responsive to the input, sending, by the computing device, a transmission comprising (i) the preference associated with the media content, and (ii) information associated with a second user account.

In another embodiment, a device is provided. The device includes a processor and memory having stored thereon instructions executable by the processor to cause the device to perform functions. The functions include receiving information identifying media content. The media content is associated with a first user account and a first service provider. The functions also include receiving an input indicating a preference associated with the media content. The functions further include, responsive to the input, sending, by the computing device, a transmission comprising (i) the preference associated with the media content, and (ii) information associated with a second user account.

In another embodiment, a non-transitory computer readable memory is provided. The non-transitory computer readable memory has stored thereon instructions executable by a computing device to cause the computing device to perform functions. The functions include receiving information identifying media content. The media content is associated with a first user account and a first service provider. The functions also include receiving an input indicating a preference associated with the media content. The functions further include, responsive to the input, sending, by the computing device, a transmission comprising (i) the preference associated with the media content, and (ii) information associated with a second user account.

In another embodiment, a method is provided. The method involves receiving, by a computing device, a request for content. The request is associated with a first user account. The method also involves, responsive to the request, transmitting media content to a media playback system. The media content is determined based on the request. The method further involves receiving a transmission identifying (i) preference data associated with the transmitted media content, and (ii) a second user account, and responsive to the transmission, associating the preference data with the second user account.

In another aspect, a device is provided. The device includes a processor and memory having stored thereon instructions executable by the processor to cause the device to perform functions. The functions include receiving, by a computing device, a request for content. The request is associated with a first user account. The functions also include, responsive to the request, transmitting media content to a media playback system. The media content is determined based on the request. The functions further include receiving a transmission identifying (i) preference data associated with the transmitted media content, and (ii) a second user account, and responsive to the transmission, associating the preference data with the second user account.

In yet another aspect, a non-transitory computer readable memory is provided. The non-transitory computer readable memory has stored thereon instructions executable by a computing device to cause the computing device to perform functions. The functions include receiving, by a computing device, a request for content. The request is associated with a first user account. The functions also include, responsive to the request, transmitting media content to a media playback system. The media content is determined based on the request. The functions further include receiving a transmission identifying (i) preference data associated with the transmitted media content, and (ii) a second user account, and responsive to the transmission, associating the preference data with the second user account.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A method comprising:
after a first computing device associated with a first user has caused a playback device separate from the first computing device to use account credentials of the first user to stream first media content from a first media streaming service to the playback device, after receiving a selection of the first media streaming service from a set of media streaming services comprising the first media streaming service and a second media streaming service, wherein the playback device is configured to stream media content from both the first media streaming service in response to a request to stream media content from the first media streaming service and the second media streaming service in response to a request to stream media content from the second media streaming service, and while the playback device is using the account credentials of the first user to stream the first media content from the first media streaming service, receiving, at a second computing device and from a second user, an indication of the second user's media content preference associated with the first media content being streamed from the first media streaming service to the playback device; and after having determined that the second user is associated with the second computing device because account credentials of the second user are stored on the second computing device, and in response to receiving the indication of the second user's media content preference associated with the first media content being streamed from the first media streaming service to the playback device, and while the playback device is using the account credentials of the first user to stream the first media content from the first media streaming service, the second computing device:

when the second user has an account with the first media streaming service, causing a computing system to associate the second user's media content preference with the account that is with the first media streaming service; and when the second user does not have an account with the first media streaming service causing the computing system to associate the second user's media content preference with an account associated with the second user, that is hosted at a different system or service;

wherein the second computing device is configured to be associated with other users when account credentials of the other users are stored on the second computing device, and wherein the computing system is separate from the playback device, the first computing device, and the second computing device.

2. The method of claim 1, wherein the second computing device associated with the second user is configured to control the playback device.

3. The method of claim 1, wherein causing the computing system to store the second user's media content preference associated with an account of the second user comprises:
sending an indication of the second user's media content preference to the first streaming media service.

4. The method of claim 1, wherein causing the computing system to store the second user's media content preference associated with an account of the second user comprises:
sending an indication of the second user's media content preference to the computing system.

5. The method of claim 1, wherein the indication of the second user's media content preference associated with the first media content being streamed from the first media streaming service to the playback device comprises an explicit preference.

6. The method of claim 5, wherein the explicit preference comprises one or more of a thumb up input, like input, thumb down input, or dislike input.

7. The method of claim 5, wherein the explicit preference comprises a rating of the first media content.

8. The method of claim 1, wherein the indication of the second user's media content preference associated with the first media content being streamed from the first media streaming service to the playback device comprises an implicit preference.

9. The method of claim 8, wherein the implicit preference comprises a command to cause the playback device to skip from playing the first media content to playing second media content, wherein the second media content is different than the first media content.

10. The method of claim 1, wherein the first media content comprises an audio track.

11. Tangible, non-transitory computer-readable media comprising instructions stored therein, wherein the instructions, when executed, cause a second computing device associated with a second user to perform functions comprising:

after a first computing device associated with a first user has caused a playback device separate from the first computing device to use account credentials of the first user to stream first media content from a first media streaming service to the playback device, after receiving a selection of the first media streaming service from a set of media streaming services comprising the first media streaming service and a second media streaming service, wherein the playback device is configured to stream media content from both the first media streaming service in response to a request to stream media content from the first media streaming service and the second media streaming service in response to a request to stream media content from the second media streaming service, and while the playback device is using the account credentials of the first user to stream the first media content from the first streaming media service, the second computing device receiving, from the second user, an indication of the second user's media content preference associated with the first media content being streamed from the first media streaming service to the playback device; and after having determined that the second user is associated with the second computing device because account credentials of the second user are stored on the second computing device, and in response to receiving the indication of the second user's media content preference associated with the first media content being streamed from the first media streaming service to the playback device, and while the playback device is using the account credentials of the first user to stream the first media content from the first media streaming service, the second computing device:

when the second user has an account with the first media streaming service, causing a computing system to associate the second user's media content preference with the account that is with the first media streaming service; and when the second user does not have an account with the first media streaming service causing the computing system to associate the second user's media content preference associated with an account associated with the second user that is hosted at a different system or service, wherein the second computing device is configured to be associated with other users when account credentials of the other users are stored on the second computing device, and wherein the computing system is separate from the playback device, the first computing device, and the second computing device.

12. The tangible, non-transitory computer-readable media of claim 11, wherein the second computing device associated with the second user is configured to control the playback device.

13. The tangible, non-transitory computer-readable media of claim 11, wherein causing the computing system to store the second user's media content preference associated with an account of the second user comprises:
sending an indication of the second user's media content preference to the first streaming media service.

14. The tangible, non-transitory computer-readable media of claim 11, wherein causing the computing system to store the second user's media content preference associated with an account of the second user comprises:

sending an indication of the second user's media content preference to the computing system.

15. The tangible, non-transitory computer-readable media of claim 11, wherein the indication of the second user's media content preference associated with the first media content being streamed from the first media streaming service to the playback device comprises an explicit preference.

16. The tangible, non-transitory computer-readable media of claim 15, wherein the explicit preference comprises one or more of a thumb up input, like input, thumb down input, or dislike input.

17. The tangible, non-transitory computer-readable media of claim 15, wherein the explicit preference comprises a rating of the first media content.

18. The tangible, non-transitory computer-readable media of claim 11, wherein the indication of the second user's media content preference associated with first media content being streamed from the first media streaming service to the playback device comprises an implicit preference.

19. The tangible, non-transitory computer-readable media of claim 18, wherein the implicit preference comprises a command to cause the playback device to skip from playing the first media content to playing second media content, wherein the second media content is different than the first media content.

20. The tangible, non-transitory computer-readable media of claim 11, wherein the first media content comprises an audio track.

* * * * *